US011458949B2

(12) United States Patent
Ogawa

(10) Patent No.: US 11,458,949 B2
(45) Date of Patent: Oct. 4, 2022

(54) TRAVEL ASSISTANCE APPARATUS FOR HYBRID VEHICLE

(71) Applicant: TOYOTA JIDOSHA KABUSHIKI KAISHA, Toyota (JP)

(72) Inventor: Yuki Ogawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 496 days.

(21) Appl. No.: 16/587,431

(22) Filed: Sep. 30, 2019

(65) Prior Publication Data

US 2020/0130670 A1   Apr. 30, 2020

(30) Foreign Application Priority Data

Oct. 31, 2018   (JP) .............................. JP2018-204961

(51) Int. Cl.
*B60W 20/13* (2016.01)
*B60W 30/182* (2020.01)
*G01C 21/36* (2006.01)

(52) U.S. Cl.
CPC .......... *B60W 20/13* (2016.01); *B60W 30/182* (2013.01); *G01C 21/3605* (2013.01)

(58) Field of Classification Search
CPC ....... B60W 20/13; B60W 20/15; G01C 21/00; G01C 21/34; G01C 21/3469
See application file for complete search history.

(56) References Cited

U.S. PATENT DOCUMENTS

| 2008/0262668 | A1* | 10/2008 | Yamada | ................... | B60K 6/46 701/22 |
| 2009/0326750 | A1* | 12/2009 | Ang | ................... | G01C 21/3469 701/1 |
| 2012/0010767 | A1* | 1/2012 | Phillips | ............. | B60W 50/0097 180/65.21 |
| 2015/0241234 | A1* | 8/2015 | Ogawa | ............... | G01C 21/3469 701/22 |
| 2015/0274028 | A1* | 10/2015 | Payne | ..................... | B60L 53/00 903/903 |
| 2016/0137185 | A1* | 5/2016 | Morisaki | ................. | B60L 50/16 180/65.265 |
| 2016/0207521 | A1* | 7/2016 | Ogawa | .................. | B60W 10/08 |

(Continued)

FOREIGN PATENT DOCUMENTS

| JP | 2015-074341 A | 4/2015 |
| WO | 2015/052921 A1 | 4/2015 |

*Primary Examiner* — Robert A Werner
(74) *Attorney, Agent, or Firm* — Sughrue Mion, PLLC

(57) ABSTRACT

A travel assistance apparatus includes an ECU that is configured to: draw up a travel plan in which any one of drive modes, including a CD mode and a CS mode, is assigned to each of travel segments of a scheduled travel route, execute travel assistance control for causing a vehicle to travel according to the travel plan; when a total of consumption energy is greater than a value obtained by adding a first margin value to a remaining battery power, draw up the travel plan and execute the travel assistance control; and, when the total of consumption energy is greater than a value obtained by adding a second margin value less than the first margin value to the remaining battery power when the travel assistance control is started again after suspension of the travel assistance control, maintain or adjust the travel plan and execute the travel assistance control.

6 Claims, 3 Drawing Sheets

(56) References Cited

U.S. PATENT DOCUMENTS

2016/0332616 A1* 11/2016 Zhao .................... B60W 10/08
2017/0066429 A1*  3/2017 Ogawa ................ B60W 10/06
2018/0334157 A1* 11/2018 Tanaka ................. B60K 6/445
2020/0391612 A1* 12/2020 Lee ...................... B60L 58/13

* cited by examiner

TRAVEL ASSISTANCE APPARATUS FOR HYBRID VEHICLE

INCORPORATION BY REFERENCE

The disclosure of Japanese Patent Application No. 2018-204961 filed on Oct. 31, 2018 including the specification, drawings and abstract is incorporated herein by reference in its entirety.

BACKGROUND

1. Technical Field

The disclosure relates to a travel assistance apparatus that manages application of a plurality of drive modes of a vehicle.

2. Description of Related Art

A travel assistance apparatus has been suggested so far (see, for example, Japanese Unexamined Patent Application Publication No. 2015-074341 (JP 2015-074341 A)). The travel assistance apparatus executes travel assistance control for causing a vehicle to travel according to a travel plan in which any one of an EV drive mode and a hybrid drive mode is assigned to each of travel segments of a scheduled travel route from a current position to a destination. The travel assistance apparatus sets the condition that energy that is required to travel according to a travel route is greater than a value obtained by adding a first margin to a remaining battery power as a condition for executing travel assistance control, and then draws up a travel plan with energy excluding a second margin less than the first margin being set for the energy that is required to travel according to the travel route.

SUMMARY

Generally, when travel assistance control cannot be continued, such as when the position of the host vehicle is temporarily lost during execution of the travel assistance control, the travel assistance control is suspended. The travel assistance control is resumed when the position of the host vehicle is located thereafter; however, when the travel assistance apparatus attempts to similarly draw up a travel plan again at that time, energy that is required to travel according to the travel route is less than a value obtained by adding the first margin to the remaining battery power when a hybrid drive mode has been executed for a long period of time before the suspension. Therefore, the condition for executing travel assistance control is not satisfied, and travel assistance control may not be executed. In this case, the remaining battery power is not efficiently used for a scheduled travel route, with the result that there is a possibility of a decrease in fuel economy because an electric drive mode can be executed in high-load travel segments.

It is a main object of the disclosure to provide a travel assistance apparatus for a hybrid vehicle, which makes it easy to maintain a travel plan when travel assistance control is resumed after suspension of the travel assistance control.

The travel assistance apparatus for a hybrid vehicle according to the disclosure is configured as follows to achieve the above main object.

A travel assistance apparatus for a hybrid vehicle according to the disclosure is a travel assistance apparatus for a hybrid vehicle including an engine, a motor, and a battery. The travel assistance apparatus includes an electronic control unit. The electronic control unit is configured to draw up a travel plan in which any one of drive modes, including a charge depleting mode and a charge sustaining mode, is assigned to each of travel segments of a scheduled travel route from a current position to a destination, execute travel assistance control for causing the hybrid vehicle to travel according to the drawn-up travel plan, when a total of consumption energy that is consumed in the travel segments is greater than a value obtained by adding a first margin value to a remaining battery power, draw up the travel plan and execute the travel assistance control, and, when the total of consumption energy that is consumed in the travel segments is greater than a value obtained by adding a second margin value less than the first margin value to the remaining battery power when the travel assistance control is started again after suspension of the travel assistance control, maintain or adjust the travel plan and execute the travel assistance control.

With the travel assistance apparatus for a hybrid vehicle according to the disclosure, when travel assistance control is started, a travel plan is drawn up and the travel assistance control is executed when a total of consumption energy that is consumed in the travel segments is greater than a value obtained by adding the first margin value to the remaining battery power. Thus, the remaining battery power is consumed according to the plan by the time the vehicle reaches the destination, so the vehicle can travel with high energy efficiency. When a total of consumption energy that is consumed in the travel segments is greater than a value obtained by adding a second margin value less than the first margin value to the remaining battery power when the travel assistance control is started again after suspension of the travel assistance control, the travel plan is maintained or adjusted and the travel assistance control is executed. Thus, even when the remaining battery power does not decrease because of the CS mode, the total of energy that is consumed in the travel segments thereafter can more easily satisfy the condition as compared to when the value is obtained by adding the first margin value to the remaining battery power. As a result, even when travel assistance control is once suspended and then resumed, a travel plan is more likely to be maintained.

In the travel assistance apparatus for a hybrid vehicle according to the disclosure, the electronic control unit may be configured to, while the travel assistance control is being executed, determine to suspend the travel assistance control when at least one of following cases is appropriate, a case where information on the travel segments is lost, a case where a position of the host vehicle is lost, and a case where a system is shut down without a change of the destination or the scheduled travel route.

In the travel assistance apparatus for a hybrid vehicle according to the disclosure, the electronic control unit may be configured to, while the electronic control unit is executing the travel assistance control, determine to exit the travel assistance control when at least one of following cases is appropriate, a case where the destination is changed, a case where the hybrid vehicle reaches the destination, a case where the remaining battery power changes, and a case where an operation to exit the travel assistance control is performed.

In the travel assistance apparatus for a hybrid vehicle according to the disclosure, the electronic control unit may be configured to, when the travel assistance control is being executed, maintain or adjust the travel plan and execute the travel assistance control on condition that the total of consumption energy that is consumed in the travel segments is greater than a value obtained by adding a third margin value less than the first margin value to the remaining battery power. Thus, even when the remaining battery power does not decrease because of the CS mode, the total of energy that is consumed in the travel segments thereafter more easily satisfy the condition as compared to when the value is obtained by adding the first margin value to the remaining battery power, so the travel plan can be maintained.

The third margin value may be equal to the second margin value. With this configuration, when the travel assistance control is once suspended and then the condition for suspension disappears, the same condition as that before suspension may be set for the condition for executing the travel assistance control. In this case, the second margin value may be zero or a value that reduces with time.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, an exemplary embodiment of the disclosure will be described.

Figure 1:
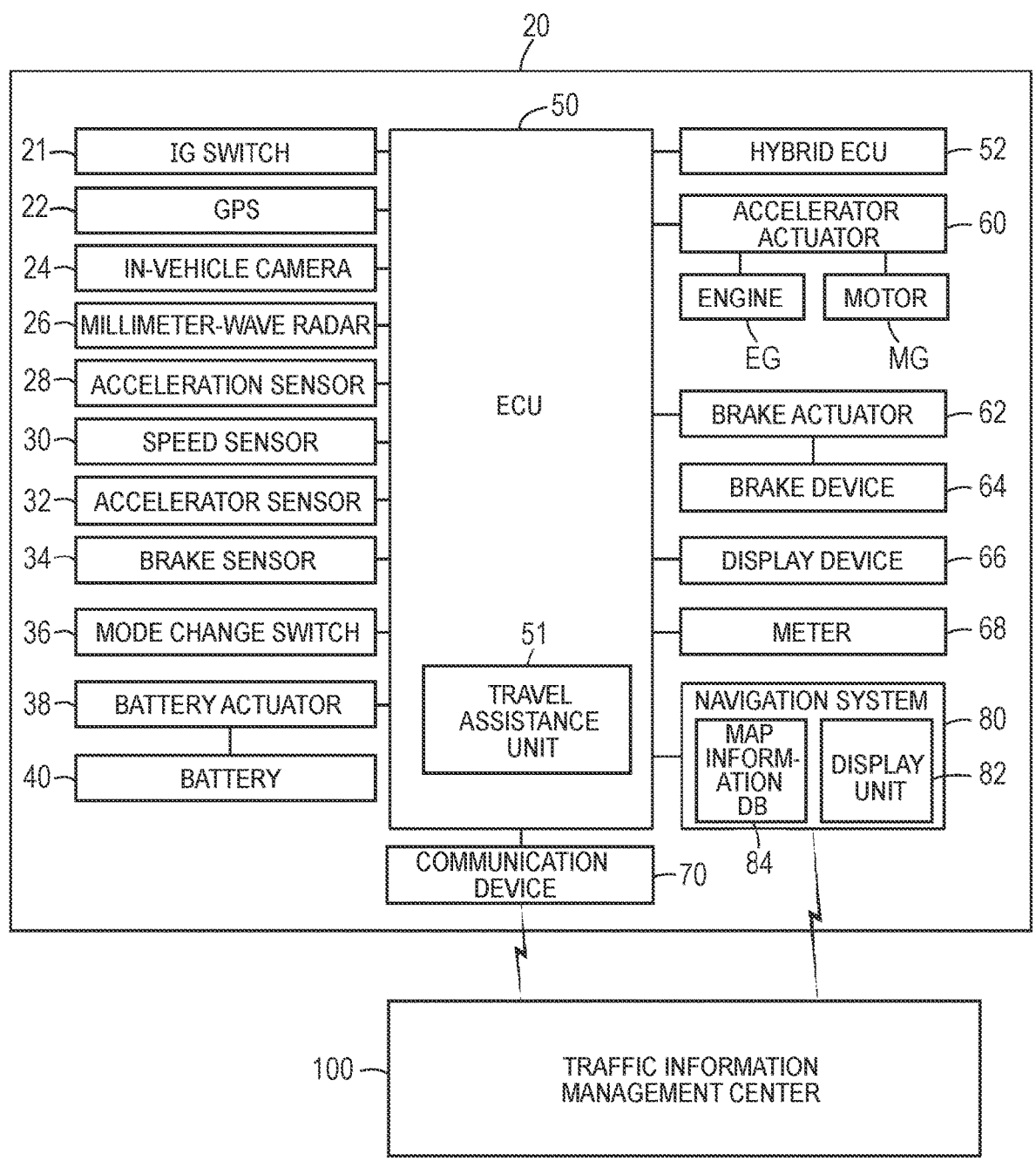
FIG. 1 is a block diagram that mainly shows an example of the configuration of a hybrid vehicle that is an embodiment of the disclosure as blocks mainly including an electronic control unit.

FIG. 1 is a block diagram that shows an example of the configuration of a hybrid vehicle 20 that serves as one embodiment of the disclosure, as blocks mainly including an electronic control unit (hereinafter, referred to as ECU) 50. As shown in the diagram, the hybrid vehicle 20 of the embodiment includes an engine EG and a motor MG as power sources. The hybrid vehicle 20 of the embodiment travels while switching a drive mode between a charge depleting mode (CD mode) and a charge sustaining mode (CS mode). In the CD mode, an electric drive mode is given a higher priority such that the state of charge (SOC) of a battery 40 is allowed to reduce. In the CS mode, the electric drive mode and a hybrid drive mode are used in combination such that the SOC of the battery 40 is maintained at a target SOC. In the electric drive mode, the hybrid vehicle 20 travels by using only power from the motor MG while stopping the operation of the engine EG. In the hybrid drive mode, the hybrid vehicle 20 travels by using both power from the engine EG and power from the motor MG while operating the engine EG.

The hybrid vehicle 20 of the embodiment includes, in addition to the power sources, the ECU 50, an ignition switch 21, a global positioning system or global positioning satellite (GPS) 22, an in-vehicle camera 24, a millimeter-wave radar 26, an acceleration sensor 28, a speed sensor 30, an accelerator sensor 32, a brake sensor 34, a mode change switch 36, a battery actuator 38, the battery 40, a hybrid electronic control unit (hereinafter, referred to as hybrid ECU) 52, an accelerator actuator 60, a brake actuator 62, a brake device 64, a display device 66, a meter 68, a communication device 70, a navigation system 80, and other devices.

The ECU 50 is a microcomputer mainly including a CPU (not shown), and includes a ROM, a RAM, a flash memory, an input port, an output port, a communication port, and others in addition to the CPU. The ECU 50 includes a travel assistance unit 51 as a functional block. When travel assistance control can be executed at the time when a route from a current position to a destination is set by the navigation system 80, the travel assistance unit 51 performs travel assistance for causing the hybrid vehicle 20 to travel while any one of the CD mode and the CS mode is assigned as the drive mode of each segment of the route.

The engine EG is, for example, an internal combustion engine. The motor MG is an electric motor that also functions as a generator, such as a synchronous generator-motor. The motor MG is connected to the battery 40 via an inverter (not shown). The motor MG is able to output driving force by using electric power that is supplied from the battery 40 or charge the battery 40 with generated electric power.

The GPS 22 detects the position of the vehicle based on signals that are transmitted from a plurality of GPS satellites. The in-vehicle camera 24 captures an image around the vehicle. A front camera that captures an image ahead of the vehicle, a rear camera that captures an image behind the vehicle, or the like, corresponds to the in-vehicle camera 24. The millimeter-wave radar 26 detects an inter-vehicle distance or relative velocity between the host vehicle and a preceding vehicle or detects an inter-vehicle distance or relative velocity between the host vehicle and a following vehicle.

The acceleration sensor 28, for example, detects the acceleration of the vehicle in a front and rear direction or detects the acceleration of the vehicle in a right and left direction (transverse direction). The speed sensor 30 detects the speed of the vehicle based on a wheel speed, or others. The accelerator sensor 32 detects an accelerator operation amount or another amount commensurate with an amount by which an accelerator pedal is depressed by a driver. The brake sensor 34 detects a brake position or another amount as an amount by which a brake pedal is depressed by the driver. The mode change switch 36 is disposed near a steering wheel at a driver seat, and is used to switch between the CD mode and the CS mode.

The battery actuator 38 manages the battery 40 based on the status of the battery 40, such as a terminal voltage, a charge and discharge current, and a battery temperature. The battery actuator 38 computes a state of charge (SOC) that is the percentage of a remaining amount of charge to a full charge capacity based on a charge and discharge current, or computes an allowable maximum output electric power (output limit) up to which electric power is allowed to be output from the battery 40 and an allowable maximum input electric power (input limit) up to which electric power is allowed to be input to the battery 40 based on the state of charge (SOC), the battery temperature, or others. The battery 40 is a chargeable and dischargeable secondary battery. For example, a lithium ion battery, a nickel-metal hydride battery, a lead storage battery, or another battery, may be used as the battery 40.

The hybrid ECU 52 is a microcomputer that mainly includes a CPU (not shown), and includes a ROM, a RAM, a flash memory, an input port, an output port, a communication port, and others in addition to the CPU. The hybrid ECU 52 sets a drive mode, or sets a target operation point (target rotation speed or target torque) of the engine EG or a torque command for the motor MG based on the set drive mode, the accelerator operation amount from the accelerator sensor 32, the brake position from the brake sensor 34, and the output limit and input limit from the battery actuator 38.

When the vehicle travels in the electric drive mode, the hybrid ECU 52 sets a required driving force or a required power based on the accelerator operation amount from the accelerator sensor 32 or the vehicle speed from the speed sensor 30, sets a torque command for the motor MG such that the vehicle outputs the required driving force or the required power, and transmits the set torque command to the accelerator actuator 60. When the vehicle travels in the hybrid drive mode, the hybrid ECU 52 sets the target operation point of the engine EG and the torque command for the motor MG such that the vehicle outputs the required driving force and the required power, and outputs the target operation point and the torque command to the accelerator actuator 60. When the brake pedal is depressed, the hybrid ECU 52 sets a required braking force based on the brake position from the brake sensor 34 or the vehicle speed from the speed sensor 30, sets a regenerative torque command for regenerative control over the motor MG based on the required braking force or vehicle speed and sets a target braking force to be generated by the brake device 64, transmits the torque command to the accelerator actuator 60, and transmits the target braking force to the brake actuator 62.

The accelerator actuator 60 controls the engine EG or the motor MG based on the target operation point or torque command set by the hybrid ECU 52. The accelerator actuator 60 executes intake air volume control, fuel injection control, ignition control, intake valve open-close timing control, or other control, such that the engine EG is operated at the target operation point (target rotation speed or target torque). The accelerator actuator 60 executes switching control over switching elements of the inverter for driving the motor MG such that a torque corresponding to the torque command is output from the motor MG.

The brake actuator 62 controls the brake device 64 such that the target braking force set by the hybrid ECU 52 is applied to the vehicle by the brake device 64. The brake device 64 is, for example, a hydraulically-driven frictional brake.

The display device 66 is incorporated in, for example, an instrument panel in front of the driver seat, and displays various pieces of information. The meter 68 is incorporated in, for example, the instrument panel in front of the driver seat.

The communication device 70 transmits information regarding the host vehicle to a traffic information management center 100 and receives road traffic information from the traffic information management center 100. Examples of the information regarding the host vehicle include the position, vehicle speed, driving power, and drive mode of the host vehicle. Examples of the road traffic information include information regarding current or future traffic congestion, information on a current average vehicle speed or predicted future average vehicle speed in a segment of a travel route, information on traffic control, information on weather, and information on a road surface condition. The communication device 70 communicates with the traffic information management center 100 at predetermined intervals (for example, intervals of 30 seconds, intervals of one minute, intervals of two minutes, or other intervals).

The navigation system 80 guides the host vehicle to a predetermined destination. The navigation system 80 includes a display unit 82 and a map information database 84. The navigation system 80 is able to communicate with the traffic information management center 100, and performs navigation in cooperation with the traffic information management center 100. In this case, once a destination is set, the navigation system 80 transmits information on the destination and information on a current position (current position of the host vehicle) acquired by the GPS 22 to the traffic information management center 100 and receives a route set based on the transmitted information by the traffic information management center 100. The navigation system 80 performs route guidance while communicating with the traffic information management center 100 at intervals of predetermined time (for example, intervals of three minutes, intervals of five minutes, or other intervals) based on the set route. Alternatively, the navigation system 80 sets a route and guides the route without cooperation with the traffic information management center 100. In this case, once a destination is set, the navigation system 80 sets a route based on information on a destination, information on a current position, and information that is stored in the map information database 84.

Figure 2:
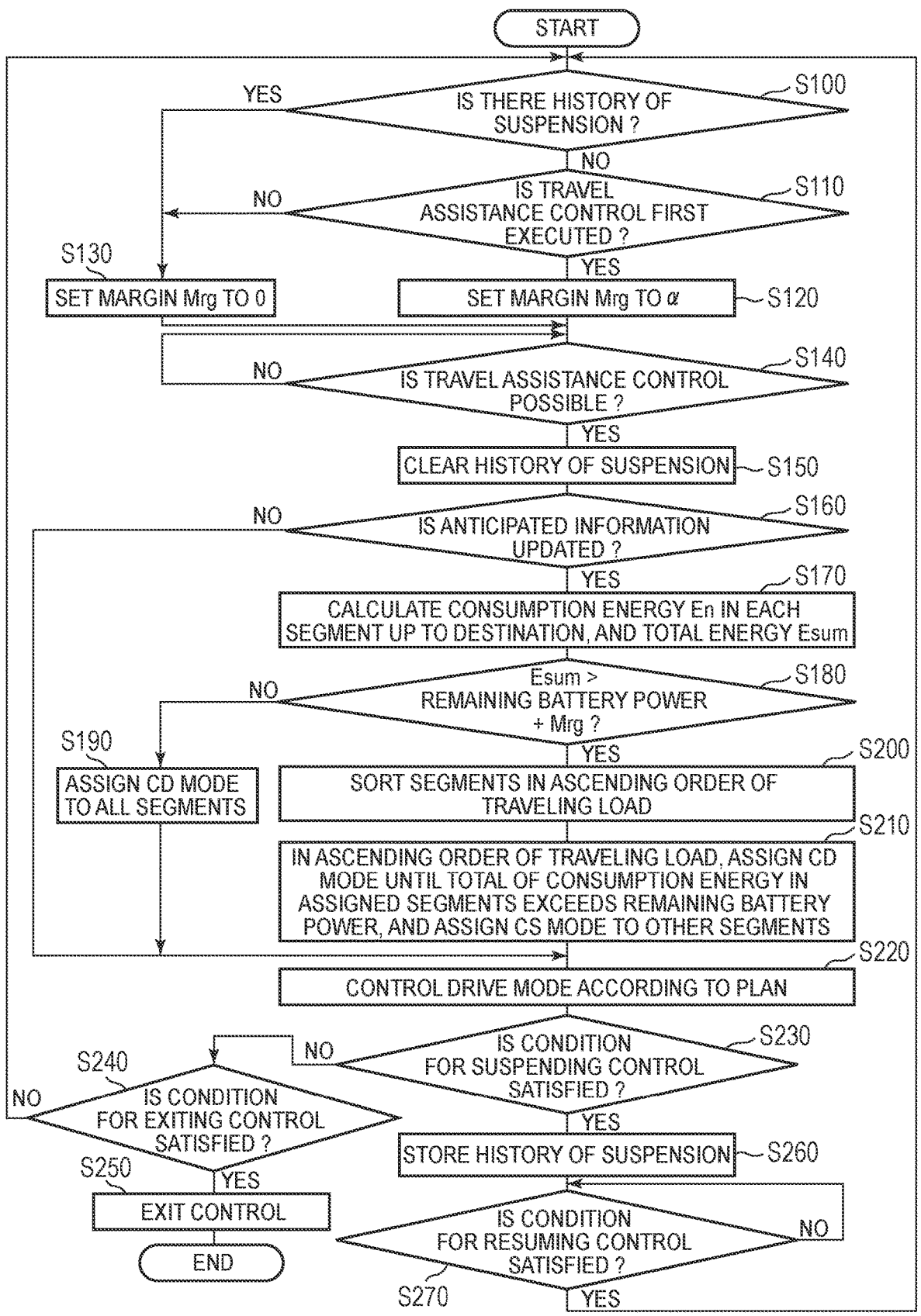
FIG. 2 is a flowchart that shows an example of travel assistance control that is executed by a travel assistance unit.

The operation of the thus configured hybrid vehicle 20, particularly, the operation at the time of executing travel assistance control, will be described. FIG. 2 is a flowchart that shows an example of travel assistance control that is executed by the travel assistance unit 51. This flowchart is executed, for example, when a destination is set.

In travel assistance control, first, it is determined whether there is a history of suspension of travel assistance control (step S100). A history of suspension of travel assistance control is stored or cleared through this routine. A condition for suspending travel assistance control will be described later. When there is no history of suspension of travel assistance control, it is determined whether travel assistance control is first executed (for the first time) after a destination is set (step S110). When it is determined that travel assistance control is executed for the first time, an initial value α is set for a margin Mrg (step S120). When it is determined that travel assistance control is executed not for the first time, zero is set for the margin Mrg (step S130). When it is determined in step S100 that there is a history of suspension of travel assistance control as well, zero is set for the margin Mrg (step S130). The margin Mrg (initial value a) when there is no history of suspension of travel assistance control and travel assistance control is executed for the first time (NO in step S100 and YES in step S110) corresponds to a first margin value. The margin Mrg (zero) when there is a history of suspension of travel assistance control (YES in step S100) corresponds to a second margin value. The margin (zero) when there is no history of suspension of travel assistance control or when travel assistance control is executed not for the first time (NO in step S100 and NO in step S110) corresponds to a third margin value.

Subsequently, it is determined whether execution of travel assistance control is possible (step S140). Since travel assistance control is, as described above, control for causing the vehicle to travel while any one of the CD mode and the CS mode is assigned as the drive mode of each segment of a route from a current position to a destination when the route is set by the navigation system 80, travel assistance control cannot be executed when no destination is set. Also, when good route guidance cannot be performed, such as when there is a malfunction in the navigation system 80 or when there is a malfunction in the GPS 22, travel assistance control cannot be executed. In step S140, whether execution of travel assistance control is possible is determined based on such circumstances. When it is determined that execution of travel assistance control is not possible, travel assistance control is on standby until execution of travel assistance control becomes possible.

When it is determined in step S140 that execution of travel assistance control is possible, a history of suspension of travel assistance control is cleared when there is the history of suspension (step S150). Subsequently, it is determined whether anticipated information (road traffic information) from the traffic information management center 100 is updated (step S160). When it is determined that the anticipated information is updated, the consumption energy En in each segment of the route from the current position to the destination and the total energy Esum that is the sum of the consumption energy En are calculated (step S170). A segment may be determined based on criteria such as whether the segment is a city road, a suburb, or a mountain area. Then, it is determined whether the total energy Esum is greater than a value obtained by adding the margin Mrg to the remaining power of the battery 40 (step S180). The remaining power of the battery 40 can be calculated by multiplying the state of charge (SOC) by the full charge capacity of the battery 40. When it is determined that the total energy Esum is less than or equal to a value obtained by adding the margin Mrg to the remaining power of the battery 40, the CD mode is assigned to all the segments (step S190). When it is determined that the total energy Esum is greater than the value obtained by adding the margin Mrg to the remaining power of the battery 40, the segments are sorted in ascending order of traveling load (consumption energy En) (step S200), the CD mode is assigned to the segments in ascending order of traveling load until the total of the consumption energy En in the assigned segments exceeds the remaining power of the battery 40, and the CS mode is assigned to the remaining segments (step S210). In other words, on condition that the total energy Esum is greater than the value obtained by adding the margin Mrg to the remaining power of the battery 40, the CD mode or the CS mode is assigned to a travel route. Then, the drive mode is controlled according to a travel plan of the assigned modes (step S220).

On the other hand, when it is determined in step S160 that anticipated information (road traffic information) from the traffic information management center 100 is not updated, the drive mode is controlled according to the travel plan drawn up immediately before (step S220).

Subsequently, it is determined whether the condition for suspending travel assistance control is satisfied (step S230). Examples of the condition for suspending travel assistance control include when information on a traveling segment is temporarily lost, when the position of the host vehicle is temporarily lost, and when the system is shut down without changing a destination or a scheduled travel route. When it is determined that the condition for suspending travel assistance control is not satisfied, it is determined whether the condition for exiting travel assistance control is satisfied (step S240). Examples of the condition for exiting travel assistance control include when a destination is changed, when the vehicle reaches a destination, when the remaining power of the battery 40 changes as a result of charging or another factor, and when an operation to exit travel assistance control is performed by the driver. When the condition for exiting travel assistance control is not satisfied, the process returns to the process of checking whether there is a history of suspension of travel assistance control in step S100. When the condition for exiting travel assistance control is satisfied, travel assistance control is exited (step S250), after which the routine is ended. When the destination is changed or when the remaining power of the battery 40 changes as a result of charging or another factor, travel assistance control is exited once. When new travel assistance control is started, the routine is executed again.

When it is determined in step S230 that the condition for suspending travel assistance control is satisfied, the history of suspension is stored (step S260), and travel assistance control is on standby until the condition for resuming travel assistance control is satisfied (step S270). Examples of the condition for resuming travel assistance control include a condition that all the conditions for suspending travel assistance control disappear. When the condition for resuming travel assistance control is satisfied, the process returns to the process of determining whether there is a history of suspension of travel assistance control in step S100.

It is assumed that a destination is set and travel assistance control is started. At this time, it is determined that there is no history of suspension of travel assistance control and travel assistance control is executed for the first time, the initial value $\alpha$ is set for the margin Mrg, and the CD mode or the CS mode is assigned to a travel route on condition that the total energy Esum is greater than a value obtained by adding the margin (initial value a) to the remaining power of the battery 40. Next, it is assumed that anticipated information (road traffic information) is updated while travel assistance control is being executed. At this time, it is determined that there is no history of suspension of travel assistance control and travel assistance control is executed not for the first time, so zero is set for the margin Mrg, and the CD mode or the CS mode is assigned to a travel route on condition that the total energy Esum is greater than a value obtained by adding the margin Mrg (zero) to the remaining power of the battery 40. Therefore, the condition is more easily satisfied than the first time, so the process of assigning the CD mode or the CS mode to a travel route is continued. Next, it is assumed that the condition for suspending travel assistance control is satisfied, a history of suspension is stored, and then the condition for resuming travel assistance control is satisfied. In this case, there is a history of suspension of travel assistance control, so zero is set for the margin Mrg, and the CD mode or the CS mode is assigned to a travel route on condition that the total energy Esum is greater than a value obtained by adding the margin Mrg (zero) to the remaining power of the battery 40. Therefore, as in the case before suspension, the process of assigning the CD mode or the CS mode to a travel route is continued.

Figure 3:
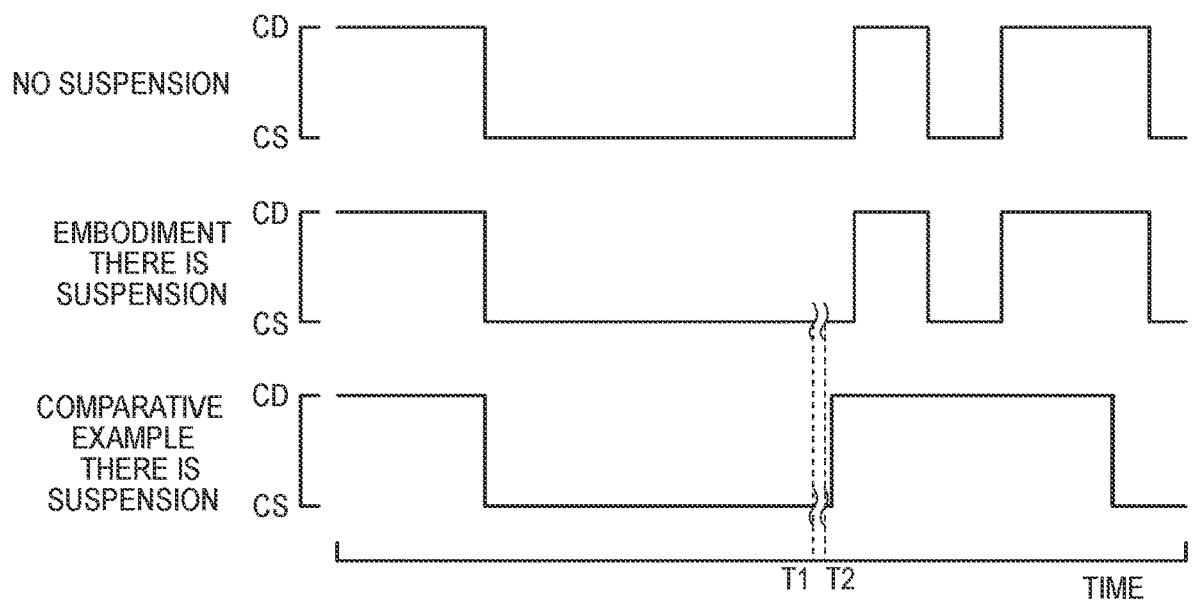
FIG. 3 shows timing charts that illustrate a comparison between the embodiment and a comparative example when travel assistance control is suspended and then the travel assistance control is resumed.

FIG. 3 shows timing charts that illustrate examples of changes with time in modes of the case where there is no suspension of travel assistance control after a travel plan is drawn up and the embodiment and comparative example when travel assistance control is resumed after suspension. In the timing charts, the top timing chart represents the case where there is no suspension of travel assistance control, the middle chart represents the embodiment when travel assistance control is resumed after suspension, and the bottom chart represents the comparative example when travel assistance control is resumed after suspension. For the comparative example, the initial value $\alpha$ is used as the margin Mrg when travel assistance control is resumed after suspension. As shown in the timing charts, when there is no suspension of travel assistance control, the vehicle travels while switching between the CD mode and the CS mode according to a travel plan. In the comparative example, the condition for suspending travel assistance control is satisfied and the control is suspended at time T1, and the condition for resuming travel assistance control is satisfied and the control is resumed at time T2. At this time, the CS mode is executed for a relatively long time, so, when the initial value α is used as the margin Mrg, the subsequent total energy Esum becomes less than or equal to a value obtained by adding the margin Mrg (initial value a) to the remaining power of the battery 40, the CD mode is assigned to all the segments, and the vehicle travels in the CD mode. When the vehicle travels in the CD mode and the remaining power of the battery 40 reaches less than or equal to a threshold at which the drive mode is switched to the CS mode, the drive mode is switched to the CS mode, and the vehicle travels. Therefore, the travel plan cannot be maintained. On the other hand, in the embodiment, regardless of whether there is suspension of travel assistance control, zero is used as the margin Mrg before and after suspension, so the travel plan is not changed before and after suspension, and the travel plan drawn up for the first time is carried out.

In the hybrid vehicle 20 of the above-described embodiment, when travel assistance control is started as a result of setting a destination, or the like, a travel plan is drawn up by assigning the CD mode or the CS mode to a travel route on condition that the initial value α is used as the margin Mrg and the total energy Esum is greater than a value obtained by adding the margin (initial value a) to the remaining power of the battery 40. Thus, the remaining power of the battery 40 is consumed according to the plan by the time the vehicle reaches the destination, so the vehicle can travel with high energy efficiency. When travel assistance control is suspended as a result of fulfillment of the condition for suspending the control and then travel assistance control is resumed as a result of fulfillment of the condition for resuming travel assistance control thereafter, a travel plan is maintained or adjusted by assigning the CD mode or the CS mode to a travel route on condition that zero is used as the margin Mrg and the total energy Esum is greater than a value obtained by adding the margin Mrg (zero) to the remaining power of the battery 40. Thus, even when the remaining power of the battery 40 does not decrease because of the CS mode, the condition that the total energy Esum is greater than a value obtained by adding the margin Mrg (zero) to the remaining power of the battery 40 can be more easily satisfied. As a result, even when travel assistance control is once suspended and then resumed, travel assistance control can be continued while a travel plan is maintained or travel assistance control can be executed while a travel plan is adjusted according to a change of a road traffic condition. Of course, when travel assistance control is being executed, a travel plan is maintained or adjusted by assigning the CD mode or the CS mode to a travel route on condition that zero is used as the margin Mrg and the total energy Esum is greater than a value obtained by adding the margin Mrg (zero) to the remaining power of the battery 40. Thus, even when the remaining power of the battery 40 does not decrease because of the CS mode, the condition that the total energy Esum is greater than a value obtained by adding the margin Mrg (zero) to the remaining power of the battery 40 can be more easily satisfied.

In the hybrid vehicle 20 of the embodiment, zero is used as the margin Mrg (third margin value) when travel assistance control is being executed. Alternatively, a value that reduces with time from the initial value α at the time of the start of travel assistance control to zero may be used as the margin Mrg (third margin value). In this case, zero may be used as the margin Mrg (second margin value) when travel assistance control is suspended as a result of fulfillment of the condition for suspending the control and then travel assistance control is resumed as a result of fulfillment of the condition for resuming the control, or a value that reduces with time from the initial value α to zero may be used. The value of the margin Mrg (third margin value) that is used when travel assistance control is being executed and the value of the margin Mrg (second margin value) that is used when travel assistance control is once suspended and then resumed may be equal to each other or may be different from each other.

In the hybrid vehicle 20 of the embodiment, the navigation system 80 is able to communicate with the traffic information management center 100 and is able to perform navigation in cooperation with the traffic information management center 100. However, the navigation system 80 need not communicate with the traffic information management center 100, and may set a route based on information on a destination, information on a current position, and information that is stored in the map information database 84, and may perform route guidance based on the set route.

The hybrid vehicle 20 of the embodiment includes the communication device 70 and communicates with the traffic information management center 100. Alternatively, the hybrid vehicle 20 need not include the communication device 70 or need not communicate with the traffic information management center 100.

The example embodiment of the disclosure is described by way of the embodiment; however, the disclosure is not limited to the above-described embodiment. Of course, the disclosure encompasses various modes without departing from the scope of the disclosure.

The disclosure is usable in hybrid vehicle manufacturing industries and other industries.

What is claimed is:

1. A travel assistance apparatus for a hybrid vehicle including an engine, a motor, and a battery, the travel assistance apparatus comprising an electronic control unit configured to:
    draw up a travel plan in which any one of drive modes, including a charge depleting mode and a charge sustaining mode, is assigned to each of travel segments of a scheduled travel route from a current position to a destination,
    determine whether a travel assistance control for causing the hybrid vehicle to travel according to the drawn up travel plan has been executed yet after the travel plan is drawn up,
    based upon the determination that travel assistance control for causing the hybrid vehicle to travel according to the drawn up travel plan has not been executed yet after the travel plan is drawn up, and based upon a determination that a total of consumption energy that is consumed in the travel segments is greater than a value obtained by adding a first margin value to a remaining battery power, execute the travel assistance control so as to cause the hybrid vehicle to travel according to the drawn up travel plan, and
    based upon the determination that travel assistance control for causing the hybrid vehicle to travel according to the drawn up travel plan has been executed after the travel plan is drawn up, and based upon a determination that the total of consumption energy that is consumed in the travel segments is greater than a value obtained by adding a second margin value less than the first margin value to the remaining battery power, maintain or adjust the travel plan and execute the travel assistance control so as to cause the hybrid vehicle to travel according to the maintained or adjusted travel plan.

2. The travel assistance apparatus according to claim 1, wherein
the electronic control unit is configured to, while the electronic control unit is executing the travel assistance control, determine to suspend the travel assistance control when at least one of following cases is appropriate, a case where information on the travel segments is lost, a case where a position of the host vehicle is lost, and a case where a system is shut down without a change of the destination or the scheduled travel route.

3. The travel assistance apparatus according to claim 1, wherein
the electronic control unit is configured to, while the electronic control unit is executing the travel assistance control, determine to exit the travel assistance control when at least one of following cases is appropriate, a case where the destination is changed, a case where the hybrid vehicle reaches the destination, a case where the remaining battery power changes, and a case where an operation to exit the travel assistance control is performed.

4. The travel assistance apparatus according to claim 1, wherein
the electronic control unit is configured to, when the travel assistance control is being executed, maintain or adjust the travel plan and control the travel assistance control on condition that the total of consumption energy that is consumed in the travel segments is greater than a value obtained by adding a third margin value less than the first margin value to the remaining battery power.

5. The travel assistance apparatus according to claim 4, wherein
the third margin value is equal to the second margin value.

6. The travel assistance apparatus according to claim 5, wherein the second margin value is any one of zero and a value that reduces with time.

* * * * *